(12) United States Patent
Azuma et al.

(10) Patent No.: US 7,495,039 B2
(45) Date of Patent: *Feb. 24, 2009

(54) WATER DISPERSION FOR INK JET RECORDING

(75) Inventors: Koji Azuma, Wakayama (JP); Takehiro Tsutsumi, Wakayama (JP); Ryuma Mizushima, Wakayama (JP); Isao Tsuru, Wakayama (JP)

(73) Assignee: Kao Corporation, Tokyo (JP)

( * ) Notice: Subject to any disclaimer, the term of this patent is extended or adjusted under 35 U.S.C. 154(b) by 679 days.

This patent is subject to a terminal disclaimer.

(21) Appl. No.: 10/875,491

(22) Filed: Jun. 25, 2004

(65) Prior Publication Data
US 2005/0004262 A1  Jan. 6, 2005

(30) Foreign Application Priority Data
Jun. 27, 2003  (JP) .............................. 2003-185443

(51) Int. Cl.
*C09D 11/00* (2006.01)
(52) U.S. Cl. .................. 523/160; 523/161; 523/200; 523/205
(58) Field of Classification Search .............. 523/160, 523/161, 200, 205
See application file for complete search history.

(56) References Cited

U.S. PATENT DOCUMENTS

| | | | | |
|---|---|---|---|---|
| 5,708,095 A | * | 1/1998 | Grezzo Page et al. | 525/301 |
| 5,852,074 A | * | 12/1998 | Tsutsumi et al. | 523/161 |
| 6,599,973 B1 | * | 7/2003 | Visscher et al. | 524/504 |
| 6,779,882 B2 | * | 8/2004 | Ungefug et al. | 347/101 |
| 6,979,481 B2 | * | 12/2005 | Gaynor et al. | 428/32.27 |
| 7,291,659 B2 | * | 11/2007 | Tsuru et al. | 523/160 |
| 7,345,099 B2 | * | 3/2008 | Takizawa et al. | 523/160 |
| 7,354,961 B2 | * | 4/2008 | Azuma et al. | 523/160 |

| | | | | |
|---|---|---|---|---|
| 2004/0030002 A1 | * | 2/2004 | Tsuru et al. | 523/160 |
| 2004/0189764 A1 | * | 9/2004 | Aono et al. | 347/100 |
| 2005/0004262 A1 | | 1/2005 | Azuma et al. | |

FOREIGN PATENT DOCUMENTS

| | | |
|---|---|---|
| EP | 1 059 341 A1 | 12/2000 |
| EP | 1 323 789 A1 | 7/2003 |
| JP | 6-306317 | 11/1994 |
| JP | 2000-144031 | 5/2000 |
| JP | 2004-2662 | 1/2004 |
| WO | WO 00/39226 | 7/2000 |

OTHER PUBLICATIONS

U.S. Appl. No. 11/576,862, filed Apr. 6, 2007, Tsuru et al.

* cited by examiner

*Primary Examiner*—Edward J Cain
(74) *Attorney, Agent, or Firm*—Oblon, Spivak, McClelland, Maier & Neustadt, P.C.

(57) ABSTRACT

The present invention relates to a water dispersion for ink jet recording, comprising water-insoluble vinyl polymer particles containing a colorant, wherein the water-insoluble vinyl polymer is a water-insoluble vinyl polymer obtained by polymerizing a monomer mixture comprising:
(A) a monomer represented by the formula (I):

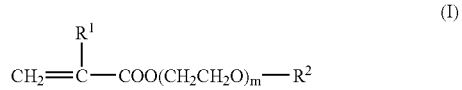

wherein $R^1$ represents a hydrogen atom or a methyl group, $R^2$ represents a hydrogen atom, an alkyl group having 1 to 20 carbon atoms or a phenyl group whose hydrogen atom may be substituted with an alkyl group having 1 to 9 carbon atoms and m denotes a number from 65 to 100;
(B) a salt-forming group-containing monomer; and
(C) a hydrophobic monomer and
the average particle diameter of the water-insoluble vinyl polymer particles containing a colorant is 0.02 to 0.50 μm.

21 Claims, No Drawings

WATER DISPERSION FOR INK JET RECORDING

FIELD OF THE INVENTION

The present invention relates to a water dispersion for ink jet recording and ink jet recording method.

BACKGROUND OF THE INVENTION

An ink jet recording system is a recording system in which ink liquid droplets are jetted directly on a recording member from very fine nozzles and stuck to the recording member to print characters and images. This system not only has the advantage that the device to be used has a low noise and good operability but also has the advantage that coloration is easy and common paper can be used as recording members and is therefore widely used. As ink used for an ink jet printer, pigment type ink has been developed or used in recent years to improve water resistance and light fastness.

In pigment type ink, it is proposed, for example, that a polymer containing a polyethylene glycol (meth)acrylate monomer and α,β-ethylenic unsaturated carboxylic acid is added (JP-A 6-306317) and that a polymer dispersant comprising a polyethylene glycol (meth)acrylate monomer or a poly(trimethylene glycol) (meth)acrylate monomer (JP-A 2000-144031) is added in order to improve optical density.

It is also proposed that a macromer is compounded to improve light fastness and high optical density (WO-A 00/39226 and the equivalent EP-A 1059341). Moreover, for example, aqueous ink containing a water dispersion of polymer particles of a water-insoluble vinyl polymer of a monomer using a combination of an ethylene oxide and a propylene oxide which ink has excellent water resistance, rub fastness and dispersion stability is proposed (JP-A 2004-2662 and the equivalent EP-A 1323789).

SUMMARY OF THE INVENTION

The present invention relates to a water dispersion for ink jet recording, comprising water-insoluble vinyl polymer particles containing a colorant, wherein the water-insoluble vinyl polymer is a water-insoluble vinyl polymer obtained by polymerizing a monomer mixture comprising:

(A) a monomer represented by the formula (I):

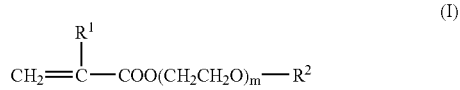

wherein $R^1$ represents a hydrogen atom or a methyl group, $R^2$ represents a hydrogen atom, an alkyl group having 1 to 20 carbon atoms or a phenyl group whose hydrogen atom may be substituted with an alkyl group having 1 to 9 carbon atoms and m denotes a number from 65 to 100;

(B) a salt-forming group-containing monomer; and (C) a hydrophobic monomer and the average particle diameter of the water-insoluble vinyl polymer particles containing a colorant is 0.02 to 0.50 μm.

The invention then provides a method of ink jet recording, comprising printing with a void type glossy medium having a void type ink receptor layer filled with a water dispersion for ink jet recording, comprising water-insoluble vinyl polymer particles containing a colorant, wherein the water-insoluble vinyl polymer is a water-insoluble vinyl polymer obtained by polymerizing a monomer mixture comprising:

(A) a monomer represented by the formula (I):

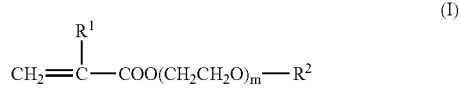

wherein $R^1$ represents a hydrogen atom or a methyl group, $R^2$ represents a hydrogen atom, an alkyl group having 1 to 20 carbon atoms or a phenyl group whose hydrogen atom may be substituted with an alkyl group having 1 to 9 carbon atoms and m denotes a number from 30 to 100;

(B) a salt-forming group-containing monomer; and (C) a hydrophobic monomer and the average particle diameter of the water-insoluble vinyl polymer particles containing a colorant is 0.02 to 0.50 μm.

DETAILED DESCRIPTION OF THE INVENTION

However, in the aforementioned prior art, glossiness meeting the requirements for print quality is unsatisfactory.

The present invention relates to a water dispersion for ink jet recording and an aqueous ink, being excellent in a high glossiness on a specialized paper and dispersion stability. The ink is excellent in light fastness, water resistance and rub fastness.

The aqueous ink for ink jet recording of the present invention has high print glossiness on paper for special use and may be preferably used as an aqueous ink for ink jet recording which can impart light fastness, water resistance, rub fastness and dispersion stability.

In the aqueous ink for ink jet recording of the present invention, the term "aqueous" means that the ratio of water in all solvents is the largest and the ratio of water may be 100%. A mixture of water and one or two or more organic solvents is also included in the aqueous solvents insofar as it satisfies the above requirements.

The aqueous ink for ink jet recording of the present invention contains a water dispersion of a water-insoluble vinyl polymer containing a colorant.

There is no particular limitation to the particle structure of the water-insoluble vinyl polymer particles containing a colorant insofar as these particles are formed of at least the colorant and the water-insoluble vinyl polymer. Examples of the particle structure include a particle structure in which the colorant is included in the water-insoluble vinyl polymer, aspartic structure in which the colorant is uniformly dispersed in the water-insoluble vinyl polymer and a particle structure in which a part of the colorant is exposed from the surface of the particle though the colorant is included in the water-insoluble vinyl polymer.

<Colorant>

As the colorant, pigments and hydrophobic dyes are preferable from the viewpoint of light fastness and water resistance. The pigments may be either organic pigments and inorganic pigments. Also, an extender pigment may be combined according to the need. Examples of the extender pigment include silica, calcium carbonate and talc.

Examples of the organic pigment include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Preferable and specific examples of the organic pigment include C.I. Pigment Yellow 13, 74, 83, 109, 110, 128 and 151, C.I. Pigment Red 48, 57, 122, 184 and 188, C.I. Pigment Violet 19, C.I. Pigment Blue 15, 15:1, 15:2, 15:3, 15:4 and 16 and C.I. Pigment Green 7 and 36.

Examples of the inorganic pigment include carbon black, metal oxides, metal sulfides and metal chlorides. Among these compounds, particularly carbon black is preferable. Examples of the carbon black include furnace black, thermal lamp black, acetylene black, channel black and the like.

Any material may be used as the hydrophobic dye insofar as it can be compounded in the polymer particle and no particular limitation is imposed on the type of hydrophobic dye. Examples of the hydrophobic dye include oil-soluble dyes and disperse dyes. The solubility of the hydrophobic dye is preferably 2 g/L and more preferably 20 to 500 g/L in the organic solvent used to dissolve the hydrophobic dye when the water-dispersion is produced from the viewpoint of compounding the dye efficiently in the water-insoluble vinyl polymer particle.

Although no particular limitation is imposed on the oil-soluble dye, examples of the oil-soluble dye include C.I. Solvent Black 3, 7, 27, 29 and 34; C.I. Solvent Yellow 14, 16, 29, 30, 56 and 82; C.I. Solvent Red 1, 3, 8, 18, 24, 27, 43, 49, 51, 72 and 73; C.I. Solvent Violet 3; C.I. Solvent Blue 2, 11 and 70; C.I. Solvent Green 3 and 7; and C.I. Solvent Orange 2.

Examples of commercially available oil-soluble dyes include Nubian Black PC-0850, Oil Black HBB, Oil Black 860, Oil Yellow 129, Oil Yellow 105, Oil Pink 312, Oil Red 5B, Oil Scarlet 308, Vali Fast Blue 2606 and Oil Blue BOS (trade names; these products are manufactured by Orient Chemical Industries, Ltd.) and Neopen Yellow 075, Neopen Mazenta SE1378, Neopen Blue 808, Neopen Blue FF4012 and Neopen Cyan FF4238 (trade names; these products are manufactured by BASF Japan Ltd.).

Although no particular limitation is imposed on the disperse dye, preferable examples of the disperse dye include C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9. Among these groups, preferable dyes are C.I. Solvent Yellow 29 and 30 as yellow dyes, C.I. Solvent Blue 70 as cyan dyes, C.I. Solvent Red 18 and 49 as magenta dyes and C.I. Solvent Black 3 and nigrosine type black dyes as black dyes.

The content of the colorant is preferably 20 to 1200 parts by weight, more preferably 50 to 900 parts by weight and even more preferably 100 to 800 parts by weight based on 100 parts by weight of the water-insoluble vinyl polymer from the viewpoint of compounding it easily in the water-insoluble vinyl polymer particle.

<Water-insoluble Vinyl Polymer>

The water-insoluble vinyl polymer is obtained by polymerizing a monomer mixture containing (A) a monomer represented by the formula (I) (monomer (A)), (B) a salt-forming group-containing monomer (monomer (B)) and (C) a hydrophobic monomer (monomer (C)). Monomers other than these monomers (A), (B) and (C) may be used within the range of the amount enough to attain the object of the present invention.

(Monomer (A))

The use of the monomer (A) represented by the formula (I) makes it possible to obtain a water dispersion for ink jet recording superior in the glossiness of a print image. This is considered to be based on the fact that a hydrophilic hydrate layer of a highly hydrophilic oxyethylene group which the monomer (A) has is spread in the aqueous ink for ink jet recording.

In the formula (I), $R^1$ represents a hydrogen atom or a methyl group and is preferably a methyl group. $R^2$ is a hydrogen atom, an alkyl group having 1 to 20 carbon atoms or a phenyl group whose hydrogen atom may be substituted with an alkyl group having 1 to 9 carbon atoms. A hydrogen atom and an alkyl group having 1 to 8 carbon atoms are preferable from the viewpoint of glossiness. Examples of the alkyl group include methyl group, ethyl group, propyl group, isopropyl group, butyl group, t-butyl group, hexyl group, octyl group and 2-ethylhexyl group.

The value m means the average added mole number and is a number from 30 to 100. It is preferably a number of 30 or more, more preferably a number from 65 or more, even more preferably a number of 70 or more and even more preferably a number of 80 or more and preferably 100 or less from the viewpoint of improving glossiness and dispersion stability when paper specialized for ink jet printer is used.

Examples of the monomer (A) include a polyethylene glycol mono(meth)acrylate, methoxypolyethylene glycol mono (meth)acrylate, octoxypolyethylene glycol mono(meth)acrylate, stearoxypolyethylene glycol mono(meth)acrylate and the like. Specific examples of commercially available monomer (A) include NK Ester M-230G manufactured by Shin-Nakamura Chemical Co., Ltd., Blenmer PME-1000 and 4000, and PSE-1300 manufactured by Nippon Oil & Fats Co., Ltd. and Light Ester 041MA manufactured by Kyoeisha Chemical Co., Ltd. It is to be noted that the term "(meth) acrylate" implies a methacrylate and an acrylate. This is the same as follows.

The content of (raw material basis) of the monomer (A) in the monomer mixture to polymerize the water-insoluble vinyl polymer is preferably 5 to 45% by weight, preferably 5 to 35% by weight and more preferably 5 to 30% by weight from the viewpoint of raising the glossiness of a print when a paper for ink jet printer use is used.

(Monomer (B))

As the salt-forming group-containing monomer (B), an anionic monomer or a cationic monomer is preferable. These anionic monomers and cationic monomers may be respectively used either singly or by mixing two or more.

Examples of the anionic monomer include one or more types selected from unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid, 2-methacryloyloxymethylsuccinic acid and the like. These compounds may be used either singly or by mixing two or more.

Examples of the unsaturated sulfonic acid monomer include styrenesulfonic acid, 2-acrylamido-2-methylpropanesulfonic acid, 3-sulfopropyl(meth)acrylate and bis-(3-sulfopropyl)-itaconate. These compounds may be used either singly or by mixing two or more.

Examples of the unsaturated phosphoric acid monomer include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate. These compounds may be used either singly or by mixing two or more.

Among these anionic monomers, unsaturated carboxylic acid monomers are preferable and acrylic acids and methacrylic acids are more preferable from the viewpoint of improving dispersion stability.

Examples of the cationic monomer include one or more types selected from unsaturated tertiary amine-containing vinyl monomers and unsaturated ammonium salt-containing vinyl monomers.

Examples of the unsaturated tertiary amine-containing monomer include N,N-dimethylaminoethyl(meth)acrylate, N,N-dimethylaminopropyl(meth)acrylate, N,N-diethylaminoethyl(meth)acrylate, N,N-dimethylaminopropyl(meth)acrylamide, N,N-dimethylarylamine, vinyl pyrrolidone, 2-vinylpyridine, 4-vinylpyridine, 2-methyl-6-vinylpyridine, 5-ethyl-2-vinylpyridine and the like. These compounds may be used either singly or by mixing two or more.

Examples of the unsaturated ammonium salt-containing monomer include N,N-dimethylaminoethyl(meth)acrylate quaternary compounds, N,N-diethylaminoethyl(meth)acrylate quaternary products and N,N-dimethylaminopropyl (meth)acrylate quaternary products. These compounds may be used either singly or by mixing two or more.

Among these cationic monomers, N,N-dimethylaminoethyl(meth)acrylate, N,N-dimethylaminopropyl(meth)acrylamide and vinyl pyrrolidone are preferable.

The content (raw material basis) of the monomer (B) in the monomer mixture to polymerize the water-insoluble vinyl polymer is 3 to 40% by weight, preferably 5 to 30% by weight and more preferably 7 to 30% by weight from the viewpoint of improving dispersion stability.

(Monomer (C))

Examples of the monomer (C) copolymerizable with the monomers (A) and (B) include (meth)acrylates, aromatic ring-containing monomers and macromers. These monomers may be used either singly or by mixing two or more. The monomer (C) preferably contains one or more types selected from the group consisting of aromatic ring-containing monomers and macromers from the viewpoint of improving water resistance and rub fastness.

Examples of the (meth)acrylate include (meth)acrylates of which the ester part is an alkyl group having 1 to 18 carbon atoms such as methyl(meth)acrylate, ethyl(meth)acrylate, (iso)propyl(meth)acrylate, (iso or tertiary)butyl(meth)acrylate, (iso)amyl(meth)acrylate, cyclohexyl(meth)acrylate, benzyl(meth)acrylate, 2-ethylhexyl(meth)acrylate, (iso)octyl(meth)acrylate, (iso)decyl(meth)acrylate, (iso)dodecyl(meth)acrylate and (iso)stearyl(meth)acrylate. These compounds may be used either singly or by mixing two or more.

It is to be noted that the aforementioned (iso or tertiary) and (iso) means both the case where these groups are present and the case where these groups are not present. The case where these groups are not present means normal.

The aromatic ring-containing monomer is preferably one or more types selected from styrene, vinylnaphthalene, α-methylstyrene, vinyltoluene, ethylvinylbenzene, 4-vinylbiphenyl, 1,1-diphenylethylene, benzyl(meth)acrylate, phenoxyethyl(meth)acrylate, 2-hydroxy-3-phenoxypropylacrylate, 2-methacryloyloxyethyl-2-hydroxypropyl phthalate, 2-acryloyloxyethylphthalic acid and neopentyl glycol acrylic acid benzoate. Among these compounds, a vinyl monomer having an aromatic hydrocarbon group having 6 to 22 carbon atoms is preferable. At least one selected from styrene, α-methylstyrene, vinyltoluene and vinylnaphthalene is more preferable from the viewpoint of water resistance and rub fastness.

Specific examples of the macromer include macromers having a polymerizable functional group at one terminal and a number average molecular weight of preferably 500 to 500,000 and more preferably 1,000 to 10,000.

Specific examples of the macromer include styrene type macromers having a polymerizable functional group at one terminal, silicone type macromers having a polymerizable functional group at one terminal, methylmethacrylate type macromers having a polymerizable functional group at one terminal, styrene/acrylonitrile type macromers having a polymerizable functional group at one terminal, butylacrylate type macromers having a polymerizable functional group at one terminal, isobutylmethacrylate type macromers having a polymerizable functional group at one terminal and the like. Among these macromers, styrene type macromers having a polymerizable functional group at one terminal are preferable from the view point of compounding a colorant sufficiently in the water-insoluble vinyl polymer.

Examples of the styrene type macromers having a polymerizable functional group at one terminal include styrene homopolymers having a polymerizable functional group at one terminal and copolymers of styrene having a polymerizable functional group at one terminal and other monomers.

In the copolymers of styrene having a polymerizable functional group at one terminal and other monomers, examples of these other monomers include acrylonitrile and the like. The content (raw material basis) of styrene in the copolymer is preferably 60% by weight or more and more preferably 70% by weight or more with the view of allowing a sufficient pigment to be contained in the water-insoluble vinyl polymer.

Among these styrene type macromers having a polymerizable functional group at one terminal, styrene type macromers having an acryloyloxy group or a methacryloyloxy group as the polymerizable functional group at one terminal are preferable.

Examples of commercially available styrene type macromers include AS-6, AS-6S, AN-6, AN-6S, HS-6S and HS-6 manufactured by Toagosei Co., Ltd.

Among silicone macromers, silicone macromers represented by the formula (V) are preferable from the viewpoint of preventing scorching of the head of an ink jet printer.

$$X(Y)_q Si(R^3)_{3-r}(Z)_r \qquad (V)$$

In the formula, X represents a polymerizable unsaturated group, Y represents a divalent connecting group, $R^3$s respectively represent a hydrogen atom, a lower alkyl group, an aryl group or an alkoxy group, Z represents the residue of a monovalent siloxane polymer having a number average molecular weight of 500 or more, q denotes a number of 0 or 1 and r denotes an integer from 1 to 3.

In the silicone macromers represented by the formula (V), X is a polymerizable unsaturated group as mentioned above. Typical examples of X include monovalent unsaturated hydrocarbon groups having 2 to 6 carbon atoms such as $CH_2=CH-$ and $CH_2=C(CH_3)-$.

Y represents a divalent connecting group as mentioned above. Typical examples of Y include divalent connecting group such as $-COO-$, $-COO(CH_2)_a-$ (where a denotes an integer from 1 to 5) and a phenylene group. Among these groups, $-COOC_3H_6-$ is preferable.

$R^3$s respectively represent a hydrogen atom, a lower alkyl group, an aryl group or an alkoxy group as mentioned above. Typical examples of $R^3$ include a hydrogen atom; lower alkyl groups having 1 to 5 carbon atoms such as a methyl group and ethyl group; aryl groups having 6 to 20 carbon atoms such as a phenyl group; and alkoxy groups having 1 to 20 carbon atoms such as a methoxy group. Among these groups, a methyl group is preferable.

Z represents the residue of a monovalent siloxane polymer having a number average molecular weight of 500 or more as mentioned above. Preferable examples of Z include the monovalent residue of dimethyl siloxane polymers having a number average molecular weight of 500 to 5000.

q denotes a number of 0 or 1 and preferably 1. r denotes an integer from 1 to 3 and more preferably 1.

Typical examples of the silicone macromers include silicone macromers represented by the following formula (VI), (VII), (VIII) or (IX).

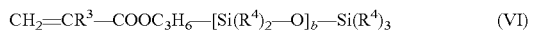  (VI)

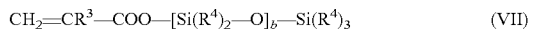  (VII)

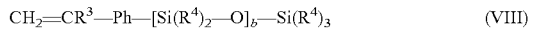  (VIII)

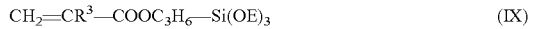  (IX)

Each symbol in the formula is as follows.

$R^3$: represents a hydrogen atom or a methyl group.

$R^4$s: respectively represent a hydrogen atom or a lower alkyl group having 1 to 5 carbon atoms.

b: denotes a number from 5 to 60.

Ph: represents a phenylene group.

E: represents a $-[Si(R^3)_2O]_c-Si(R^3)_3$ group (where $R^3$ is the same as above and c denotes a number of 5 to 65).

Among these groups, silicone macromers represented by the formula (VI) are preferable and particularly, silicone macromers represented by the following formula (X) are preferable.

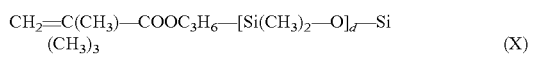  (X)

In the formula, d denotes a number of 8 to 40. Specific examples of the silicone macromer include FM-0711 (trade name, manufactured by Chisso Corporation) and the like.

The number average molecular weight of the macromer is measured by gel chromatography using 1 mmol/L of dodecyldimethylamine-containing chloroform as a solvent and polystyrene as a standard material.

The content (raw material basis) of the monomer (C) in the monomer mixture to polymerize the water-insoluble vinyl polymer is preferably 15 to 87% by weight, more preferably 35 to 85% by weight and even more preferably 40 to 83% by weight from the viewpoint of improving water resistance.

When an aromatic ring-containing monomer is used as the monomer (C), the content of the aromatic ring-containing monomer in the monomer (C) is preferably 1 to 100% by weight, more preferably 5 to 90% by weight and even more preferably 10 to 80% by weight from the viewpoint of improving water resistance, rub fastness and dispersion stability.

When a macromer is used as the monomer (C), the content of the macromer in the monomer (C) is preferably 1 to 80% by weight, more preferably 2 to 60% by weight and more preferably 5 to 40% by weight with the view of improving water resistance and rub fastness.

(Method of Producing the Water-insoluble Vinyl Polymer)

The water-insoluble vinyl polymer is produced by polymerizing a monomer composition by a known polymerization method such as a block polymerization method, solution polymerization method, suspension polymerization method and emulsion polymerization method. Among these polymerization methods, a solution polymerization method is preferable.

The solvent used in the solution polymerization method is preferably a polar organic solvent. In the case where the polar organic solvent is miscible with water, it may be mixed with water when used.

Examples of the polar organic solvent include aliphatic alcohols having 1 to 3 carbon atoms such as ethanol and propanol; ketones such as acetone and methyl ethyl ketone; and esters such as ethyl acetate. Among these compounds, ethanol, acetone, methyl ethyl ketone or mixed solutions of these solvents and water are preferable.

When the polymerization is carried out, a radical initiator may be used. As the radical initiator, azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile) and 1,1'-azobis(1-cyclohexanecarbonitrile) are preferable. Also, organic peroxides such as t-butyl peroxyoctoate, di-t-butyl peroxide and dibenzoyl oxide may be used.

The amount of the initiator is preferably 0.001 to 5 mol and more preferably 0.01 to 2 mol per 1 mol of the monomer mixture.

In the polymerization, a polymerization chain transfer agent may be further added. Specific examples of the polymerization chain transfer agent include mercaptans such as octylmercaptan, n-dodecylmercaptan, t-dodecylmercaptan, n-tetradecylmercaptan and 2-mercaptoethanol; xanthogen disulfides such as dimethylxanthogen disulfide and diisopropylxanthogen disulfide; thiuram disulfides such as tetramethylthiuram disulfide and tetrabutylthiuram disulfide; hydrocarbon halides such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, turbinolene, α-terpinene, γ-terpinene, dipentene, α-methylstyrene dimer, 9,10-dihydroanthracene, 1,4-dihydronaphthalene, indene and 1,4-cyclohexadiene; and unsaturated heterocyclic compounds such as 2,5-dihydrofuran. These polymerization chain transfer agents may be used either singly or by mixing two or more.

The condition under which the monomer is polymerized differs depending on, for example, kinds of radical initiator, monomer and solvent to be used. Generally, the polymerization temperature is preferably 30 to 100° C. and more preferably 50 to 80° C. and the polymerization time is preferably 1 to 20 hours. The polymerization atmosphere is preferably an atmosphere of inert gas such as nitrogen gas or argon.

After the polymerization reaction is finished, the produced water-insoluble vinyl polymer may be isolated from the reaction solution by a known method such as reprecipitation and distillation of a solvent. The obtained water-insoluble vinyl polymer may be purified by repeating reprecipitation or by removing unreacted monomers and the like by means of membrane separation, a chromatographic method or an extraction method.

The solubility of the water-insoluble vinyl polymer at 25° C. in water, after the salt-forming group is neutralized with sodium hydroxide or acetic acid, depending on the kind of the salt-forming group, is preferably 10% by weight or less, more preferably 5% by weight or less and even more preferably 1% by weight or less from the viewpoint of improving the dispersion stability of the aqueous ink for ink jet recording.

The weight average molecular weight (measured by the method described in Production Examples below disclosed) of the water-insoluble vinyl polymer is preferably 3,000 to 300,000 and more preferably 5,000 to 200,000 from the viewpoint of improving dispersion stability.

<Water Dispersion of a Water-insoluble Vinyl Polymer Containing a Colorant and Aqueous Ink>

The water dispersion of the water-insoluble vinyl polymer particles containing a hydrophobic dye as the colorant may be produced by a known emulsifying method. For example, the water-insoluble polymer and the hydrophobic dye are dissolved in an organic solvent, to which a neutralizing agent is then added according to the need to ionize a salt-forming group in the water-insoluble vinyl polymer. Then, after water is added to the solution, a dispersion operation is carried out using a dispersing machine or a ultrasonic emulsifier according to the need and then the organic solvent is distilled to phase-transfer to a water system, whereby the water dispersion can be obtained.

The method of obtaining the water dispersion of the water-insoluble vinyl polymer particles containing a pigment as the colorant is preferably a method in which the water-insoluble vinyl polymer is dissolved in an organic solvent, a pigment, water and a neutralizing agent and, as required, a surfactant are added to the solution, the mixture is then kneaded, the mixture is then diluted with water as required and then the organic solvent is distilled to change the phase to a water system.

As the organic solvent, alcohol type solvents, ketone type solvents and ether type solvents are preferable. Among these solvents, hydrophilic organic solvents are more preferable.

Examples of the alcohol type solvent include ethanol, isopropanol, n-butanol, tertiary butanol, isobutanol, diacetone alcohol and the like.

Examples of the ketone type solvent include acetone, methyl ethyl ketone, diethyl ketone, methyl isobutyl ketone and the like. Examples of the ether type solvent include dibutyl ether, tetrahydrofuran, dioxane and the like. Among these solvents, isopropanol, acetone and methyl ethyl ketone are preferable.

Also, the organic solvent may be combined with high-boiling point hydrophilic organic solvents according to the need. Examples of the high-boiling point hydrophilic organic solvent include phenoxy ehtanol, ethylene glycol monomethyl ether, diethylene glycol monomethyl ether, diethylene glycol monoethyl ether, diethylene glycol diethyl ether and the like.

As the neutralizing agent, an acid or a base may be used to meet the kind of the salt-forming group. Examples of the acid include inorganic acids such as hydrochloric acid and sulfuric acid and organic acids such as acetic acid, propionic acid, lactic acid, succinic acid, glycolic acid, gluconic acid and glyceric acid. Examples of the base include tertiary amines such as trimethylamine and triethylamine, ammonia, sodium hydroxide and potassium hydroxide.

There is no particular limitation to the degree of neutralization. Generally, the resulting water dispersion is preferably in a neutral state, for example, in a pH range from 4.5 to 10.

In the water dispersion and aqueous ink of the invention, the average particle diameter of the water-insoluble vinyl polymer particles containing a colorant is 0.02 to 0.50 μm, preferably 0.02 to 0.30 μm and more preferably 0.05 to 0.20 μm from the viewpoint of improving the glossiness. The average particular diameter corresponds to "the average particle diameter before storage" shown in Examples and measured according to the method shown in Examples.

<Aqueous Ink for Ink Jet Recording>

In the water dispersion and aqueous ink of the invention, the content (the solid) of the water-insoluble vinyl polymer particles containing a colorant may be adjusted to 0.5 to 30% by weight, more preferably 1 to 20% by weight and even more preferably 2 to 15% by weight from the viewpoint of obtaining a water dispersion or an aqueous ink for ink jet recording having good dispersion stability.

The aqueous ink for ink jet recording of the present invention may optionally contain additives such as a wetting agent, dispersant, antifoaming agent, mildew proofing agent and chelating agent in addition to the water dispersion.

As the wetting agent, polyhydric alcohols or their ethers such as ethylene glycol, propylene glycol, diethylene glycol, triethylene glycol, polyethylene glycol, glycerin, diethylene glycol diethyl ether and diethylene glycerin mono-n-butyl ether, acetates, N-methyl-2-pyrrolidone and nitrogen-containing compounds such as 1,3-dimethylimidazolidinone may be used. The amount of the wetting agent in the aqueous ink for ink jet recording is preferably 0.1 to 50% by weight and more preferably 0.1 to 30% by weight.

As the dispersant, an anionic, nonionic, cationic or amphoteric dispersant may be used.

In the water dispersion and aqueous ink of the invention, the water content may be preferably 40 to 90 wt. %, more preferably 50 to 80 wt. %.

The aqueous ink for ink jet recording of the present invention is considered to be improved in glossiness and dispersion stability by the action of the hydrophilic hydrate layer of an oxyethylene group in the monomer (A).

When a pigment or a hydrophobic dye is used as the colorant of the aqueous ink for ink jet recording of the present invention, a print product having a high light fastness and a water resistance can be obtained.

<Recording Medium>

The recording medium used in the present invention is one which may be applied to an ink jet recording system. The recording medium includes paper, plastics and composites of these materials and is void type glossy medium having a void type ink receptor layer.

Here, the void type ink receptor layer is provided with a void type ink receptor layer constituted of porous inorganic particles such as alumina or silica and a water-soluble resin (binder). The void type glossy medium having such a void type ink receptor layer is a known one and is described in, for example, "Ink Jet Printer, Application and Material" ((K.K.) CMC), p 174-181.

The recording medium in the present invention is preferably a void type glossy medium with a glossy mirror surface having a 60° glossiness of preferably 45 or less, more preferably 38 or less, even more preferably 35 or less, even more preferably 10 or more. Here, the glossiness is measured by a glossimeter (trade name: HANDY GLOSSMETER, Product number: PG-1, manufactured by Nippon Denshoku Industries, Co., Ltd.).

Commercially available specific examples of the recording medium used in the present invention include MC gloss paper manufactured by Seiko Epson Corporation, Premium Plus Photo Paper (matted paper) manufactured by HEWLETT PACKARD, GP-301 manufactured by Canon Inc and the like.

<Ink Jet Recording Method>

The ink jet recording method of the present invention is preferably carried out by applying an ink jet recording system using the aforementioned aqueous ink for ink jet recording and the void type glossy medium having a void type ink receptor layer as a recording medium.

The ink jet recording method of the present invention is superior in the point that the effect of the present invention is particularly produced by a combination of the aqueous ink for ink jet recording and the void type glossy medium having an ink receptor layer.

EXAMPLES

Production Examples 1 and 2 and Comparative Production Examples 1 and 2

20 parts by weight of methyl ethyl ketone, 0.03 parts by weight of a polymerization chain transfer agent (2-mercaptoethanol) and 10% by weight of each monomer (shown by parts by weight) shown in Table 1 were placed in a reactor and mixed. The atmosphere in the reactor was replaced sufficiently by nitrogen gas to obtain a mixed solution.

Nakamura Chemical Co., Ltd., a compound represented by the formula (I) in which m is 23 and $R^1$ and $R^2$ are respectively a methyl group;

Methoxypolyethylene glycol monomethacrylate (m=30): Trade name: Light Ester 041MA, manufactured by Kyoeisha Chemical Co., Ltd., a compound represented by the formula (I) in which m is 30 and $R^1$ and $R^2$ are respectively a methyl group;

Methoxypolyethylene glycol monomethacrylate (m=90): Trade name: Blenmer PME-4000, manufactured by NOF CORPORATION, a compound represented by the formula (I) in which m is 90 and $R^1$ and $R^2$ are respectively a methyl group;

Styrene macromer: Trade name: AS-6S (Styrene Macromer), manufactured by Toagosei Co., Ltd., number average molecular weight: 6000, polymerizable functional group: methacryloyloxy group.

TABLE 1

| | | Production example 1 | Production example 2 | Comparative production example 1 | Comparative production example 2 |
|---|---|---|---|---|---|
| Kind of monomer | Methoxypolyethylene glycol monomethacrylate (m = 23) | 0 | 0 | 0 | 25 |
| (A) | Methoxypolyethylene glycol monomethacrylate (m = 30) | 25 | 0 | 0 | 0 |
| | Methoxypolyethylene glycol monomethacrylate (m = 90) | 0 | 25 | 0 | 0 |
| | Methoxypolyethylene glycol monomethcrylate (m = 2) | 0 | 0 | 25 | 0 |
| (B) | Methacrylic acid | 14 | 14 | 14 | 14 |
| (C) | Butyl methacrylate | 10 | 10 | 10 | 10 |
| | Styrene monomer | 36 | 36 | 36 | 36 |
| | Styrene macromer | 15 | 15 | 15 | 15 |
| | Weight average molecular weight | 55000 | 40000 | 40000 | 60000 |
| | Neutralization degree (%) | 100 | 100 | 100 | 100 |
| | average particle size (μm) of water dispersion | 0.11 | 0.11 | 0.16 | 0.10 |

On the other hand, the remainder, namely, 90% by weight of each monomer (shown by parts by weight) shown in Table 1 was placed in a dropping funnel and then, 0.27 parts by weight of a polymerization chain transfer agent (2-mercaptoethanol), 60 parts by weight of methyl ethyl ketone and 1.2 parts by weight of 2,2'-azobis(2,4-dimethylvaleronitrile) were added and mixed, followed by replacing the atmosphere in the dropping funnel sufficiently by nitrogen gas to obtain a mixed solution.

The mixed solution in the reactor was raised to 65° C. with stirring in a nitrogen atmosphere and the mixed solution in the dropping funnel was gradually dripped in the reactor over 3 hours. After the dripping was finished, the solution temperature of the mixed solution was kept at 65° C. for 2 hours. Thereafter, a solution obtained by dissolving 0.3 parts by weight of 2,2'-azobis(2,4-dimethylvaleronitrile) in 5 parts by weight of methyl ethyl ketone was added to the mixed solution, which was then further ripened at 65° C. for 2 hours and at 70° C. for 2 hours to obtain a polymer solution.

A part of the resulting polymer solution was dried at 105° C. under reduced pressure for 2 hours to remove solvents thereby isolating the polymer. The weight average molecular weight of the polymer was measured by gel permeation chromatography using a polystyrene as a standard material and 60 mmol/L of phosphoric acid and 50 mmol/L of lithium bromide-containing dimethylformamide as a solvent.

The details of each compound shown in Table 1 are as follows;

Methoxypolyethylene glycol monomethacrylate (m=23): Trade name: NK Ester M-230G, manufactured by Shin- Examples 1 to 2 and Comparative Examples 1 and 2

12.5 Parts by weight of a polymer obtained by drying each polymer solution obtained in Production Examples 1 and 2 and Comparative Production Examples 1 and 2 under reduced pressure was dissolved in 45 parts by weight of methyl ethyl ketone. A neutralizing agent (aqueous 20% sodium hydroxide solution) was added to the solution in a fixed amount to neutralize the salt-forming group. Further, 12.5 parts by weight of a phthalocyanine pigment (C.I. Pigment·Blue 15:3, manufactured by Dainippon Ink and Chemicals, Incorporated, trade name: Fastogen Blue TGR-SD) was added and the mixture was kneaded by using a beads mill for 2 hours.

120 parts by weight of ion exchange water was added to the obtained kneaded product and the mixture was stirred. Then, methyl ethyl ketone was removed at 60° C. under reduced pressure and a part of the water was further removed to obtain a water dispersion of pigment-containing water-insoluble vinyl polymer particles having a solid concentration of 20% by weight. The average particle size of the obtained water dispersion was determined by the below shown method. Results are shown in Table 1.

A water dispersion for ink jet recording was prepared using the resulting water dispersion. The composition of the ink is shown below;

Water dispersion 30% by weight
Glycerin 10% by weight
Triethylene glycol monobutyl ether 7% by weight
Surfinol 465 (Air Products and Chemicals, Inc.) 1 parts by weight Ploxel XL2(S)(AVECIA Corporation) 0.08% by weight
Ion exchange water 51.92% by weight A mixed solution obtained by mixing the above each component was filtered by a needle-less syringe (manufactured by Terumo Corporation) having a capacity of 25 mL and equipped with a 0.5 μm filter (acetyl cellulose film, outside diameter: 2.5 cm, manufactured by Fuji Photo Film Co., Ltd.) to remove coarse particles, thereby obtaining an aqueous ink for ink jet recording having the composition shown in Table 2.

Next, the properties of the obtained aqueous ink for ink jet recording were evaluated based on the following method. The results are shown in Table 2.

(1) Gloss

An ink jet printer (Model Number EM900C, manufactured by Seiko Epson Corporation) was used to carry out solid image printing using a commercially available MC glossy paper (60° glossiness: 18) as a paper for specific use. The paper was allowed to stand at 25° C. for one hour to measure the glossiness (measured at 60°) by a glossimeter (trade name: HANDY GLOSSMETER, Product Number: PG-1, manufactured by Nippon Denshoku Industries, Co., Ltd.) and the glossiness was measured.

Glossiness more than 38 is excellent and glossiness more than 40 is much excellent.

(2) Light Fastness

The solid print product obtained by carrying out solid image printing on a commercially available copy paper was irradiated continuously with light by 10000 counts by using a Xenon Fademeter (trade name, manufactured by ATLAS) to measure the print density of the same print position as that measured before the irradiation again by using a Macbeth Densitometer RD914. The residual rate of the print density obtained after the irradiation to that obtained before the irradiation was calculated according to the following equation to evaluate the light fastness based on the following evaluation standard:

Residual rate (%)=[(Print density after irradiation)/(Print density before irradiation)]×100

(Evaluation Standard)
⊙: Residual rate of 95% or more.
○: Residual rate of 80% or more and less than 95%.
Δ: Residual rate of 60% or more and less than 80%.
×: Residual rate less than 60%.

(3) Water Resistance

The aforementioned printer was used to carry out solid printing on a commercially available copy paper, which was then dried at 25° C. for one hour to make a sample. The optical density of a specified position on the sample was measured, then dipped vertically in static water for 10 seconds and pulled up vertically as it was. The paper was dried at 25° C. for 24 hours. The optical density on the same position as that measured before the dipping was measured to find the residual rate of the optical density measured after the dipping to that measured before the dipping according to the following equation. The water resistance was evaluated based on the following evaluation standard:

Residual rate (%)=(Optical density after dipping)/(optical density before dipping)×100

(Evaluation Standard)
⊙: Residual rate of 95% or more.
○: Residual rate of 80% or more and less than 95%.
Δ: Residual rate of 60% or more and less than 80%.
×: Residual rate less than 60%.

(4) Rub Fastness

The aforementioned printer was used to carry out solid image printing on a commercially available copy paper, which was then dried at 25° C. for 24 hours. Thereafter, the print surface was strongly rubbed by a finger. The condition of the removal of the print image was evaluated based on the following evaluation standard.

(Evaluation Standard)
⊙: Print image is not removed at all.
○: Almost no print image is removed and any place around the print image is not soiled.
Δ: Print image is removed a little and places around the print image and fingers are soiled a little.
×: Print image is considerably removed and places around the print image and fingers are soiled considerably.

(5) Average Particle Diameter and Dispersion Stability

The average particle diameter (hereinafter referred to as "average particle diameter before storage" of the colorant-containing polymer particles included in the ink was measured using a Laser Particle Analysis System ELS-8000 (Cumulant method) manufactured by Otsuka Electronics Co., Ltd. The ink was placed in a closed container, stored in a 60° C. thermostatic oven for one month and the average particle diameter (hereinafter referred to as "average particle diameter after storage" of the colorant-containing polymer particles in the same manner. As the index of the dispersion stability, the dispersion stability factor was calculated according to the following equation and evaluated based on the following standard.

Dispersion stability factor (%)=[(Average particle diameter after storage)/(Average particle diameter before storage)]×100

(Evaluation Standard)
⊙: Dispersion stability factor is 95% or more and less than 105%.
○: Dispersion stability factor is 90% or more and less than 95%, or 105% or more and less than 110%.
Δ: Dispersion stability factor is 70% or more and less than 90%, or 110% or more and less than 130%.
×: Dispersion stability factor is less than 70% or 130% or more.

TABLE 2

|  |  | Example | | Comparative example | |
| --- | --- | --- | --- | --- | --- |
|  |  | 1 | 2 | 1 | 1 |
| Ink composition | Kind of pigment-containing polymer particle | Production example 1 | Production example 2 | Comparative production example 1 | Comparative production example 2 |
|  | Solid content of the water dispersion of pigment-containing polymer particles (% by mass) | 6.0 | 6.0 | 6.0 | 6.0 |
|  | Glycerin | 10.0 | 10.0 | 10.0 | 10.0 |
|  | Triethylene glycol monobutyl ether | 7.0 | 7.0 | 7.0 | 7.0 |

TABLE 2-continued

| | | Example | | Comparative example | |
|---|---|---|---|---|---|
| | | 1 | 2 | 1 | 1 |
| | Surfinol 465 | 1.0 | 1.0 | 1.0 | 1.0 |
| | Ploxel XL2 (S) | 0.08 | 0.08 | 0.08 | 0.08 |
| | Ion exchange water | 75.92 | 75.92 | 75.92 | 75.92 |
| Measuring item | Glossiness | 39 | 45 | 23 | 35 |
| | Light fastness | ○ | ○ | ○ | ○ |
| | Water resistance | ○ | ○ | ○ | ○ |
| | Rub fastness | ○ | ○ | Δ | ○ |
| | Dispersion stability | ◎ | ◎ | Δ | ○ |
| | Average particle diameter (μm) | 0.10 | 0.10 | 0.15 | 0.11 |

As shown by the results in Table 2, it was found that all the aqueous ink for ink jet recording obtained in Examples are provided with a highly glossy printing in using paper for specific use and a excellent dispersion stability, then being good light fastness, water resistance and rub fastness.

The invention claimed is:

1. A water dispersion for ink jet recording, comprising water-insoluble vinyl polymer particles containing a pigment, wherein the water-insoluble vinyl polymer is a water-insoluble vinyl polymer obtained by polymerizing a monomer mixture comprising:

(A) a monomer represented by the formula (I):

wherein $R^1$ represents a hydrogen atom or a methyl group, $R^2$ represents a hydrogen atom, an alkyl group having 1 to 20 carbon atoms or a phenyl group whose hydrogen atom may be substituted with an alkyl group having 1 to 9 carbon atoms and m denotes a number from 30 to 100;

(B) a salt-forming group-containing monomer; and
(C) a monomer copolymerizable with monomers (A) and (B) and the average particle diameter of the water-insoluble vinyl polymer particles containing a pigment is 0.02 to 0.50 μm.

2. The water dispersion according to claim 1, wherein the monomer mixture comprises 5 to 45 wt. % of (A) the monomer represented by the formula (I), 3 to 40 wt. % of (B) the salt-forming monomer and 15 to 87 wt. % of (C) the hydrophobic monomer.

3. The water dispersion according to claim 1 or 2, wherein the hydrophobic monomer (C) comprises at least one selected from the group consisting of an aromatic ring-containing monomer and a macromer.

4. The water dispersion according to claim 1 or 2, wherein the copolymerizable monomer (C) is at least one aromatic ring-containing monomer selected from the group consisting of styrene, α-methylstyrene, vinyltoluene and vinylnaphthalene.

5. The water dispersion according to claim 1 or 2, wherein the copolymerizable monomer (C) is a styrene macromer having a polymerizable functional group at one terminal thereof.

6. An aqueous ink for ink jet recording comprising the water dispersion according to claim 1 or 2.

7. A method of ink jet recording, comprising printing with a void type glossy medium having a void type ink receptor layer filled with a water dispersion for ink jet recording, comprising water-insoluble vinyl polymer particles containing a pigment, wherein the water-insoluble vinyl polymer is a water-insoluble vinyl polymer obtained by polymerizing a monomer mixture comprising:

(A) a monomer represented by the formula (I):

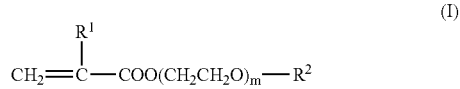

wherein $R^1$ represents a hydrogen atom or a methyl group, $R^2$ represents a hydrogen atom, an alkyl group having 1 to 20 carbon atoms or a phenyl group whose hydrogen atom may be substituted with an alkyl group having 1 to 9 carbon atoms and m denotes a number from 30 to 100;

(B) a salt-forming group-containing monomer; and
(C) a monomer copolymerizable with monomers (A) and (B) and the average particle diameter of the water-insoluble vinyl polymer particles containing a pigment is 0.02 to 0.50 μm.

8. The water dispersion for ink jet recording of claim 1, wherein a content of said pigment is from 20 to 1200 parts by weight based on 100 parts by weight for said water-insoluble vinyl polymer.

9. The water dispersion for ink jet recording of claim 1, wherein m is a number of 80 or more.

10. The water dispersion for ink jet recording of claim 1, wherein a content of monomer (A) is 5 to 45 wt. %.

11. The water dispersion for ink jet recording of claim 1, wherein a content of monomer (B) is 3 to 40 wt. %.

12. The water dispersion for ink jet recording of claim 1, wherein monomer (B) is at least one of an anionic monomer and a cationic monomer.

13. The water dispersion for ink jet recording of claim 1, wherein said monomer (A) is at least one monomer selected from the group consisting of unsaturated carboxylic acid monomers, unsaturated sulfonic acid monomers, unsaturated phosphoric acid monomers, unsaturated tertiary amine-containing vinyl monomers and unsaturated ammonium salt-containing vinyl monomers.

14. The water dispersion for ink jet recording of claim 1, wherein said monomer (A) is at least one monomer selected from the group consisting of acrylic acid, methacrylic acid, crotonic acid, itaconic acid, maleic acid, fumaric acid, citraconic acid, 2-methacryloyloxymethylsuccinic acid, styrenesulfonic acid, 2-acrylamido-2-methylpropanesulfonic acid, 3-sulfopropyl(meth)acrylate, bis-(3-sulfopropyl)-itaconate, vinylphosphonic acid, vinyl phosphate, bis(methacryloxyethyl)phosphate, diphenyl-2-acryloyloxyethyl phosphate, diphenyl-2-methacryloyloxyethyl phosphate, dibutyl-2-acryloyloxyethyl phosphate N,N-dimethylaminoethyl (meth)acrylate, N,N-dimethylaminopropyl(meth)acrylate, N,N-diethylaminoethyl (meth)acrylate, N,N-dimethylaminopropyl(meth)acrylamide, N,N-dimethylarylamine, vinyl pyrrolidone, 2-vinylpyridine, 4-vinylpyridine, 2-methyl-6-vinylpyridine, 5-ethyl-2-vinylpyridine, N,N-dimethylaminoethyl(meth)acrylate quaternary compounds, N,N-diethylaminoethyl(meth)acrylate quaternary products and N,N-dimethylaminopropyl(meth)acrylate quaternary products.

15. The water dispersion for ink jet recording of claim 1, wherein said water-insoluble vinyl polymer has a weight average molecular weight of from 3,000 to 300,000.

16. The water dispersion for ink jet recording of claim 1, wherein said water dispersion has a pH ranging from 4.5 to 10.

17. The water dispersion for ink jet recording of claim 1, wherein said water-insoluble vinyl polymer particles containing a pigment is present in an amount of 0.5 to 30 wt. %.

18. The water dispersion for ink jet recording of claim 1, wherein a water content is from 40 to 90 wt. %.

19. The method of ink jet recording of claim 7, wherein said void type glossy medium has a 60° glossiness of 45 or less.

20. The water dispersion of claim 1, wherein m denotes a number from 30 to 90.

21. The method of claim 7, wherein m denotes a number from 30 to 90.

* * * * *